J. T. Barnstead,
Scraping Leather.
No. 4,258. Reissued Feb. 14. 1871.
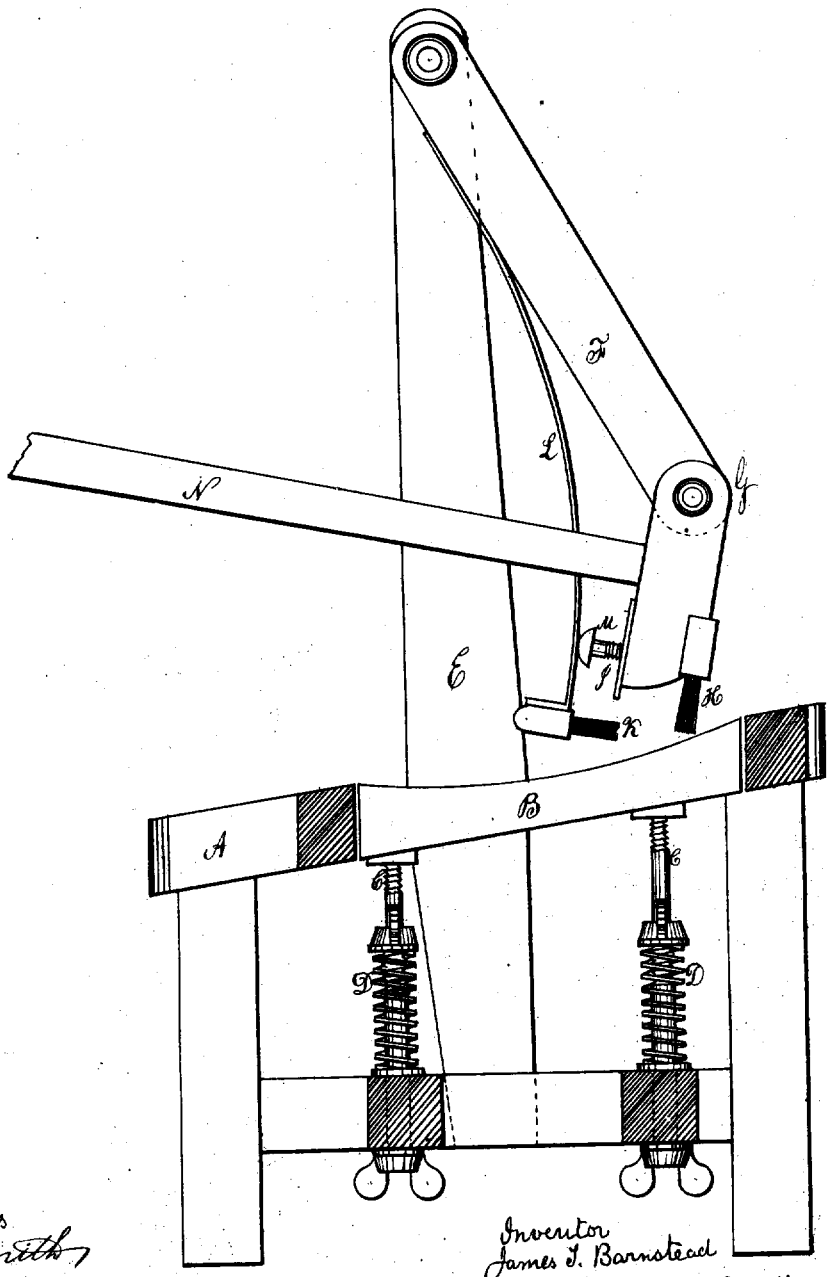
Witnesses
O. E. Smith
J. R. Nichols
Inventor
James T. Barnstead
By his attorney J. A. Bassett
N. PETERS, PHOTO-LITHOGRAPHER, WASHINGTON, D. C.

United States Patent Office.

AMES T. BARNSTEAD, OF PEABODY, ASSIGNOR, BY MESNE ASSIGNMENTS, TO GEORGE L. NEWCOMB, OF SALEM, AND JAMES PERKINS, OF PEABODY, MASSACHUSETTS.

Letters Patent No. 101,081, dated March 22, 1870; reissue No. 4,258, dated February 14, 1871.

IMPROVEMENT IN MACHINES FOR SCRAPING LEATHER.

The Schedule referred to in these Letters Patent and making part of the same.

I, JAMES T. BARNSTEAD, of Peabody, in the county of Essex and State of Massachusetts, have invented certain Improvements in Machines for Scraping Grease from Leather, of which the following is a specification.

My machine has for its object the removal of the partially-dried coating of grease from upper-leather, which remains upon the surface after being "stuffed;" and consists of a vibrating arm jointed near the lower end, carrying a knife which reciprocates over a curved bed-plate, which is upheld by springs, and the height of which, in relation to the knife, is adjusted by screws; and It further consists in combining with said knife a brush or brushes, which clean the leather after the scraper has passed over it, together with a brush by which the knife is cleaned at each reciprocation.

In the drawing—

A represents the frame of the machine, made of wood or iron in a substantial manner.

B is the curved bed-plate upon which the leather is placed.

The bed-plate B is supported by the standards C, which rest upon springs D, which are made adjustable so as to adjust the height of the bed and its position relatively to the knife and regulate its elasticity.

The standard E supports a pendulum-arm, F, to the lower part of which the knife I is attached.

The pendulum-arm F is made in two parts and jointed at G, so that the knife is raised clear of the leather at the return stroke, and the connecting-rod N is connected with the lower end of the pendulum-arm F.

The brush H is placed opposite the knife I, nad is for the purpose of cleaning the leather after the knife has scraped it.

The brush K is attached to a thin strip of metal, L, which is attached to the upper part of the pendulum. This brush clears the knife of the grease which collects upon it at each stroke. The brush passes down over the knife at each return stroke of the pendulum.

The distance of the brush K from the pendulum-arm F is adjusted by the screw M.

Power is applied to the pendulum through the connecting-rod or pitman N, which is attached to a crank or a fly-wheel.

In this machine the reciprocating motion of the knife scrapes off the partially-dried grease from the surface of the leather, fitting it more perfectly for the whitening process than can be done by hand-labor.

Previous to my invention this work has been done wholly by hand, and in an imperfect manner, as compared with the results obtained by the use of this machine.

A much larger amount of grease is removed from the leather because the knife has a more positive and forcible motion than when done by hand-labor. One machine will accomplish the same amount of work that four or five men are able to do in the same time. The leather is easier whitened because the surface is drier and cleaner.

The use of the brush H may be dispensed with in some cases and upon some kinds of leather, and the knife used alone, accomplishing nearly the same result.

The brush K may be made of whalebone, or of steel or iron wires, or of any suitable material; but I have found that a whalebone-brush is best adapted for the the purpose.

I claim as my invention—

1. A machine for removing grease from leather, having the jointed vibrating arm F, carrying a scraper, I, arranged to reciprocate over a curved bed-plate, B, which is provided with adjusting screws and springs, substantially in the manner as set forth and shown.

2. In a machine for scraping grease from leather, the combination of the knife I and brush H, in the manner and for the purpose substantially as set forth.

3. The brush K, for the purpose of cleaning the knife, arranged and operated in the manner described and shown.

JAMES T. BARNSTEAD.

Witnesses:

J. A. BASSETT,

JAMES PERKINS.